United States Patent [19]

Schmidt et al.

[11] 4,396,593

[45] Aug. 2, 1983

[54] PROCESS FOR THE PRODUCTION OF TIN(IV) CHLORIDE

[75] Inventors: Werner Schmidt, Burgkirchen; Harald Scholz; Nikolaus Niedzielski, both of Burghausen, all of Fed. Rep. of Germany

[73] Assignee: Hoechst Aktiengesellschaft, Fed. Rep. of Germany

[21] Appl. No.: 346,299

[22] Filed: Feb. 5, 1982

[30] Foreign Application Priority Data

Feb. 11, 1981 [DE] Fed. Rep. of Germany ....... 3104737

[51] Int. Cl.$^3$ .............................................. C01G 19/08
[52] U.S. Cl. .................................... 423/494; 423/91
[58] Field of Search ................................... 423/494, 91

[56] References Cited

U.S. PATENT DOCUMENTS

| 877,262 | 1/1908 | Townsend | 423/494 |
| 1,897,360 | 2/1933 | Buttfield | 423/494 |
| 2,047,545 | 7/1936 | Buttfield | 423/494 |
| 3,848,052 | 11/1974 | De Forest et al. | 423/494 |

FOREIGN PATENT DOCUMENTS 2417078 12/1974 Fed. Rep. of Germany .

Primary Examiner—O. R. Vertiz
Assistant Examiner—Jackson Leeds
Attorney, Agent, or Firm—Connolly and Hutz

[57] ABSTRACT

Chlorine is reacted with excess tin in liquid tin(IV) chloride at 20° to 90° C., 30 to 300 dm$^3$ (S.T.P.)h$^{-1}$ of chlorine being passed in per dm$^3$ of tin(IV) chloride present in the reaction chamber and 0.08 to 0.3 dm$^3$h$^{-1}$ of tin(IV) chloride being recycled with cooling per 1 dm$^3$ (S.T.P.)h$^{-1}$ of chlorine passed in. An excess of tin of at least 4 times the weight of chlorine passed in per hour is maintained. An amount of tin(IV) chloride is taken out of the cycle such that the level of the tin(IV) chloride in the reaction chamber remains approximately constant. The tin(IV) chloride taken off is brought into contact at 60° to 110° C. for an average residence time of 1 to 7 hours with tin in liquid tin(IV) chloride, thereafter filtered and, if appropriate, treated with absorbing agents. Pure, ready-for-use tin(IV) chloride is obtained continuously without a purification by distillation in a simple, readily cleanable apparatus made of a cheap material.

13 Claims, No Drawings

PROCESS FOR THE PRODUCTION OF TIN(IV) CHLORIDE

The invention relates to a process for the production of tin(IV) chloride corresponding to patent claim 1.

Tin(IV) chloride has been known for a long time. It is usually produced from metallic tin and chlorine. A number of processes are known for this direct generation from the elements, in which, for example, gaseous chlorine is passed into molten tin and the tin(IV) chloride escaping in a gaseous form is condensed after fractionation. Another process describes the spraying of molten tin into an atmosphere of chlorine gas and the subsequent condensation of the tin(IV) chloride formed. In a further known process, chlorine gas is initially passed upwards through molten tin, the resulting mixture of chlorine and gaseous tin(IV) chloride is then passed over the surfaces of more molten tin and the tin(IV) chloride formed is then separated from the gas mixture by condensation.

These processes have the disadvantage that the high heat of formation of the tin(IV) chloride makes the reaction difficult to control, it being possible for metallic tin to become so hot that it glows, or to react with the appearance of flames. The tin(IV) chloride escaping violently in a gaseous form, possibly in a mixture with unreacted chorine gas, can sweep away tin particles, thereby leading to difficulties.

The formation of tin(II) chloride presents a further problem. To lower it, it is known to add at least 5% by weight of antimony as a catalyst to the molten tin. It is also possible to add antimony(V) chloride. This in turn has the disadvantage that the antimony(V) chloride added or formed is likewise volatile and decomposes in escaping, which makes it necessary to separate the tin(IV) chloride formed from the antimony(V) chloride or its decomposition products. All processes mentioned up to now require special devices for the condensation and fractionation of the tin(IV) chloride escaping in a gaseous form from the reaction chamber.

Furthermore, a process is known in which solid tin in the form of ingots is reacted with chlorine in such a manner that the heat of reaction causes the tin to melt. The molten tin drops into liquid, cooled tin(IV) chloride and solidifies. Chlorine is additionally passed into the tin(IV) chloride from below and reacts with the solidified tin to give more tin(IV) chloride. The melting of the tin due to the reaction with chlorine can be controlled by condensing, in a reflux condenser, the gaseous tin(IV) chloride formed in the reaction in such a manner that it drips back as a liquid into the melting zone of the tin, whilst uncondensed gases are passed back into the melting zone of the tin from below.

This process has the disadvantage that the melting zone is difficult to control. The tin ingots can sinter easily and form a block which then reacts with chorine only at the surface and melts, so that dripping of the molten tin into the liquid tin(IV) chloride is no longer ensured. This process, as all the others described above in which metallic tin is reacted with chlorine while melting, in addition requires expensive materials which are resistant to chlorine gas at the high temperature prevailing. In all, relatively complex, expensive equipment is used.

U.S. Pat. No. 1,897,360 discloses a discontinuous process in which ingots of solid metallic tin are reacted with chlorine in liquid tin(IV) chloride. An amount of chlorine is passed from below into the mixture of tin and tin(IV) chloride such that not all of its reacts with the tin. The chlorine not consumed in the first pass collects in the upper part of the vessel, and is drawn off from there, cooled and passed back into the vessel from below together with fresh chlorine. A part of the liquid tin(IV) chloride is drawn off from the reaction chamber, and it is also cooled and passed back into the reaction chamber. During the reaction the liquid is brought to the boil, and tin(IV) chloride vapors are cooled together with the excess chlorine gas and passed back. In order to avoid an uncontrolled reaction of the metallic tin with the excess chlorine present in the gas space, the tin charge should obviously always be covered completely by tin(IV) chloride. The tin(IV) chloride produced is drawn off at the bottom of the reaction chamber. To carry out the reaction in such a manner that all the chlorine dissolved in the tin(IV) chloride reacts with the metallic tin so that therefore no excess chlorine collects in the gas space above the tin(IV) chloride and is recycled is said to be industrially not feasible.

In the process described last and in the process described before that, the tin(IV) chloride produced still contains as a rule considerable amounts of dissolved chlorine. In neither case is anything said about a purification of the tin(IV) chloride.

All the processes mentioned up to now have already been known for over 40 years. A recent, German Offenlegungsschrift, No. 2,417,078 also discloses a process in which chlorine is passed into liquid tin simultaneously with tin(IV) chloride. To remove the resulting heat of reaction, advantageously about seven times the amount of the tin(IV) chloride formed by the chlorination is passed into the liquid tin. As is demonstrated by this more recent publication, controlling the temperature during the reaction of chlorine with molten tin is still as much of a problem as before. In addition, the more recent process has disadvantages which arise in the reaction of tin with chlorine at high temperatures (formation of tin(II) chloride, corrosion and comparatively elaborate fractional condensation of the tin(IV) chloride formed). The German Offenlegungsschrift mentioned describes the processes in which tin is reacted with chlorine in tin(IV) chloride at temperatures below 114° C. under atmospheric pressure as "relatively inefficient".

A process has now been found which makes it possible to produce tin(IV) chloride continuously from tin and chlorine in high purity in a simple apparatus, without corrosion problems and without the use of a condensation or rectification apparatus. This process for the production of tin(IV) chloride by reacting excess metallic tin with chlorine in the presence of liquid tin(IV) chloride at temperatures of 20° to 90° C., if appropriate under pressure, in which process chlorine is passed from below into the reaction chamber, the tin(IV) chloride formed is removed at the top from the reaction chamber and is reintroduced into the reaction chamber from below after cooling and in which as much tin(IV) chloride is discharged as is required for the level of tin(IV) chloride in the reaction chamber to remain constant, comprises passing in, per $dm^3$ of tin(IV) chloride present in the reaction chamber, 30 to 300 $dm^3$ (S.T.P.)$h^{-1}$ of chlorine, maintaining an excess of tin of at least four times the weight of the weight of chlorine passed in per hour and recycling, per 1 $dm^3$(S.T.P.)$h^{-1}$ of chlorine passed in, 0.08 to 0.3 $dm^3 h^{-1}$ of tin(IV) chloride, tin(IV) chloride which is taken out of circulation being treated without the addition of chlorine at a temperature of 60° to 100° C. and for an average residence time of 1 to about 7 h in at least one further reaction chamber filled with metallic tin and tin(IV) chloride, then filtering it and, if desired, contacting it with absorbing agents.

The metallic tin should be as pure as possible. A metal is advantageously used which contains 99.8 to 99.99% of tin.

The metal can be in the form of granules, small blocks, small rods or bars. The size and shape of the pieces of tin is not particularly critical. A shape is advantageously chosen which, in the reaction chamber, does not have a tendency to form bridges or to jam and which has a surface area as large as possible in relation to its volume. It should be ensured that the pieces of tin fill the reaction chamber evenly from the bottom to the top.

It is possible for the tin charge to project beyond the level of liquid tin(IV) chloride in the reaction chamber. It is a particular feature of the process according to the invention that a relatively small amount of chlorine is present in the gas space above the liquid tin(IV) chloride, that is to say the partial pressure of the chlorine is less than 20% of the total pressure prevailing in the gas space. The result of this is that the reaction with metallic tin is neither a violent nor an uncontrolled reaction which could produce, for example, the undesirable effect of the tin(IV) chloride boiling at the surface.

The chlorine is passed in near the bottom of the reaction chamber, devices being advantageously chosen which ensure a uniform inflow of the chlorine across the cross-section of the reaction chamber, for example sieve plates, frits or perforated spheres. In general the chlorine is passed in at room temperature and special cooling is not necessary. As far as possible it should be free from other halogens, in particular bromine.

Advantageously a slim cylindrical vessel with an upright axis and which advantageously has a height-/diameter ratio of 4 to 20 is chosen as the reaction chamber. To conduct away the heat of reaction, the vessel should have a jacket through which a cooling medium, for example water, flows. Inserts for the purpose of cooling, such as cold fingers or cooling pipes, are not only not required but they are rather disadvantageous since they can interfere with the uniform distribution of the tin pieces in the reaction chamber.

The reaction vessel advantageously contains at the bottom one inlet opening for gaseous chlorine and a second inlet opening for liquid tin(IV) chloride and above this a horizontal tray which is permeable to gas and liquid but impermeable to tin pieces lying on top of it. A perforated plate is advantageously used. At the top of the vessel there are located at least one opening for passing in or conducting away gas, one further opening for the passing in of tin pieces and, at a distance below, on the side of the shell of the vessel, an opening for conducting away liquid tin(IV) chloride. The distance between the lateral opening in the upper part of the vessel and the perforated plate in the lower part of the vessel should be as large as possible, ie. at least three quarters of the total height of the vessel, in order to achieve a good space-time yield of tin(IV) chloride.

When being operated, the vessel is filled with liquid tin(IV) chloride to the upper lateral opening. Liquid is drawn off from the opening mentioned, passed through a cooling device, for example through a serpentine pipe heat exchanger or a plate heat exchanger, and is passed back again, via a pump, at the bottom into the reaction vessel. As much tin(IV) chloride is removed from the liquid being recycled as is required to maintain the level of the liquid in the reaction vessel approximately at a constant value.

The temperature of the liquid tin(IV) chloride in the reaction chamber is maintained during the reaction at 20° to 90° C. Below 20° C. an unnecessarily large cooling effort is required, and in addition, the course of the reaction also becomes more sluggish. Above 90° C., the gas space above the liquid tin(IV) chloride contains larger amounts of gaseous chlorine, which can lead to difficulties due to the violent reaction with metallic tin which is in this gas space, or, if the gas space does not contain any metallic tin, unnecessarily high amounts of chlorine are conducted away and make necessary an additional cleaning effort on the exit gas. The last point is also true for amounts of gaseous tin(IV) chloride which are present in the gas space at reaction temperatures above 90° C. The reaction of chlorine with tin while recycling tin(IV) chloride is preferably carried out at 30° to 80° C.

The tin(IV) chloride being recycled during the reaction is cooled down to 10° to about 25° C. by means of the heat exchanger already described above. In general it is not necessary to cool to lower temperatures and it would require an unnecessarily large cooling effort.

It has been found that the process for the production of tin(IV) chloride by reacting excess, metallic tin with chlorine in liquid tin(IV) chloride while recycling and cooling a part of the liquid tin(IV) chloride, as described in principle in U.S. Pat. No. 1,897,360 already mentioned above, can be carried out at a high efficiency, in spite of the contrary opinion of expert circles and in particular of the applicant of U.S. Pat. No. 1,897,360 itself (see German Offenlegungsschrift No. 2,417,078, page 2, lines 12 to 23), if, per $dm^3$ of liquid tin(IV) chloride present in the reaction chamber, 30 to 300 $dm^3(S.T.P.)h^{-1}$ of chlorine are passed into the reaction chamber, the excess of the tin is maintained at at least 4 times the weight of the weight of chlorine passed in per hour and, per 1 $dm^3(S.T.P.)h^{-1}$ of chlorine passed in, 0.08 to 0.3 $dm^3h^{-1}$ of liquid tin(IV) chloride is recycled.

If fewer than 30 $dm^3(S.T.P.)h^{-1}$ of chlorine are passed in per $dm^3$ of liquid tin(IV) chloride present, the reaction of chlorine with tin is admittedly readily controlled, but too little tin(IV) chloride is formed so that the profitability of the process becomes unnecessarily low. If more than 300 $dm^3(S.T.P.)h^{-1}$ of chlorine are passed in per $dm^3$ of liquid tin(IV) chloride present in the reaction chamber, the temperature in the reaction chamber is no longer adequately controllable. It can happen that the tin(IV) chloride boils up and that an unnecessarily high amount of gaseous chlorine is released into the gas space above the tin(IV) chloride. 60 to 150 $dm^3(S.T.P.)h^{-1}$ of chlorine are preferably passed in per $dm^3$ of tin(IV) chloride present in the reaction chamber.

The excess of metallic tin should be maintained at at least four times the weight of the weight of chlorine passed in per hour. If less tin is present in the reaction chamber, large amounts of gaseous chlorine are lost and, in addition, difficulties can arise on replenishing the metallic tin since during this operation too much chlorine escapes or an uncontrolled reaction between tin and chlorine takes place in the gas space above the tin(IV) chloride. The upper limit for the excess of metallic tin compared with the chlorine passed in is only determined by economic considerations. In general, not more than 100 parts by weight of metallic tin are used per part by weight of chlorine passed in per hour. An excess of 6 to 60 parts by weight of metallic tin per part by weight of chlorine passed in per hour, that is about 20 to 200 g of tin per $dm^3(S.T.P.)h^{-1}$ of chlorine, is advantageously used.

The "reaction zone" in the sense of the description of the present invention is that space defined by one or more reaction chambers or vessels in which metallic tin is present in addition to tin(IV) chloride and chlorine and into which tin(IV) chloride is circulated, including the gas space present above the reaction mixture in the corresponding reaction vessels. Chambers described later in which metallic tin is present in addition to tin(IV) chloride, but into which no tin(IV) chloride is circulated and into which no chlorine is passed, and in which the low chlorine content of the tin(IV) chloride is made even lower are differentiated by being designated "aftertreatment reaction chambers".

The amount of tin(IV) chloride being recycled depends on the amount of chlorine passed in and on the temperature difference of the tin(IV) chloride before and after cooling. As already mentioned above, tin(IV) chloride is cooled to temperatures of 10° to 25° C. in order to avoid unnecessary cooling expense. If less than 0.08 $dm^3h^{-1}$ of tin(IV) chloride is recycled per 1 $dm^3(S.T.P.)h^{-1}$ of chlorine passed in, the desired reaction temperature can no longer be safely maintained and amounts of chlorine and tin(IV) chloride are lost unnecessarily to the gas space. If more than 0.3 $dm^3h^{-1}$ of liquid tin(IV) chloride is recycled per 1 $dm^3(S.T.P.)h^{-1}$ of chlorine passed in, the temperature in the reaction chamber is lowered too rapidly and the space-time yield suffers. 0.12 to 0.2 $dm^3h^{-1}$ of liquid tin(IV) chloride is preferably recycled with cooling per 1 $dm^3(S.T.P.)h^{-1}$ of chlorine passed into the reaction chamber.

In a preferred embodiment of the process according to the invention the reaction chamber from which tin(IV) chloride is removed and recycled is composed of a plurality of reaction chambers separate from one another, each of which is filled with metallic tin and through which, successively, tin(IV) chloride flows, whilst either the total amount or a major amount of chlorine is passed into the reaction chamber into which the tin(IV) chloride is returned and, if appropriate, a remaining amount of chlorine is introduced into the reaction chamber which is the next in the direction of flow of the tin(IV) chloride. Advantageously a plurality of, preferably 2 to 4, cylindrical, upright reaction vessels, as described above, can be used as the reaction chambers which are separated from one another. The tin(IV) chloride which leaves one reaction vessel through the upper opening arranged on the side of the shell is advantageously re-introduced at the bottom of the next reaction vessel. The liquid tin(IV) chloride leaving the reaction vessel which, in the direction of flow of the tin(IV) chloride, is the last vessel is cooled and reintroduced at the bottom into the reaction vessel which, in the direction of flow of the tin(IV) chloride, is the first vessel, the amount of tin(IV) chloride being taken off being such that the level of liquid in the reaction vessels, which are advantageously arranged in the form of a cascade, remains the same. It is of course also possible to use several circulations of cooled, liquid tin(IV) chloride, though, as a rule, this represents an unnecessary expense.

It is in general sufficient to introduce the total amount of chlorine at the bottom of the reaction chamber which, in the direction of flow of the tin(IV) chloride, is the first reaction chamber. In particular, if more than two reaction chambers are used, it can be advantageous to introduce a part of the chlorine, ie. less than about 40% of the total amount of chlorine and preferably less than 25% of the total amount of chorine, at the bottom of the reaction chamber which, in the direction of flow of the tin(IV) chloride, is the second reaction chamber. If a plurality of reaction chambers is used for the reaction of tin with chlorine while recycling tin(IV) chloride, the conditions indicated in the preceding pages of the description for one reaction chamber apply analogously to all the reaction chambers.

Tin(IV) chloride taken out of the recycle is treated in at least one further reaction chamber (which is distinguished by being called "aftertreatment reaction chamber") which is filled with metallic tin and tin(IV) chloride, without the addition of chlorine, at a temperature of 60° to 100° C. and for an average residence time of 1 to about 7 h. In order not to increase equipment costs too much, not more than 5 aftertreatment reaction chambers will in general be used. The purpose of this aftertreatment is to lower the chlorine content of the tin(IV) chloride to below 0.02% by weight. Since the tin(IV) chloride taken out of the recycle still contains only a small amount, as a rule not more than 0.3 to 1% by weight, of chlorine, the heat of reaction is normally not sufficient to maintain the aftertreatment reaction chamber at the desired temperature. It must therefore be heated, for example by means of a jacket through which a heating medium, for example water or oil, flows. If the temperature in the aftertreatment reaction chamber drops below 60° C., it is then no longer possible to obtain an almost chlorine-free tin(IV) chloride in industrially acceptable residence times. At temperatures above 110° C., too much tin(IV) chloride vaporizes and entails an unnecessary expense on cooling equipment; in addition, unnecessary chlorine losses occur. The aftertreatment of the tin(IV) chloride is preferably carried out in the presence of metallic tin at 80° to 100° C.

The size of the aftertreatment reaction chamber must be chosen such that the tin(IV) chloride has an average residence time of 1 to about 7 hours therein. Below a residence time of one hour the aftertreatment effect is in general not sufficient. The upper limit for the residence time is determined only by economic considerations. In the aftertreatment of the tin(IV) chloride a residence time of 1.5 to 3.5 hours is preferably set.

In a further preferred embodiment of the process according to the invention the aftertreatment reaction zone is also composed of several, in particular two to three reaction chambers, separate from one another which are filled with metallic tin and through which, one after the other, tin(IV) chloride flows. The upright, cylindrical vessels described above can be used for the aftertreatment as for the main reaction.

After leaving the final aftertreatment reaction chamber the tin(IV) chloride is cooled down to room temperature and filtered, for example through a multilayer filter covered with paper or through a fabric filter or a nonwoven filter. Recycle of tin(IV) chloride is dispensed with.

It is advantageous, in particular in the case of continuous operation, to provide a filter in a by-pass to the cycle in which by-pass the liquid tin(IV) chloride is recycled with cooling during the main reaction. From time to time, after a longer or shorter running time, and according to the degree of contamination of the tin or of the chlorine used, the tin(IV) chloride being recycled is filtered through the by-pass for a few hours, and during this time, as far as this is required, the process is operated with a reduced quantity of chlorine passed in.

It is also advantageous to control the amount of chlorine passed in during the main reaction and the amount of tin(IV) chloride which is recycled and cooled during the main reaction as a function of the temperature in the reaction chamber or in one of the reaction chambers in which the main reaction takes place.

Due to the reaction of chlorine with the metallic tin, the latter decreases more or less rapidly in the various reaction chambers. In order to ensure a uniformly satisfactory space-time yield and a good aftertreatment effect, it is advantageous to replenish each reaction chamber, also the one(s) serving for the aftertreatment, with metallic tin in the form of solid pieces or bars in a continuous manner or at intervals (batchwise), at the latest when only two thirds, and preferably when only four fifths, of the total reaction chamber which is filled with tin(IV) chloride contains metallic tin. It is also advantageous to use in the aftertreatment more finely divided tin, for example smaller pieces or granules, than in the main reaction for which bars which have, for example, 10 to 1,000 times the weight of the tin pieces used in the aftertreatment can also be used.

For loading the reaction chambers with tin no special apparatuses or safety arrangements are necessary. The escape of chlorine or of tin(IV) chloride vapors is avoided by introducing, together with the tin, a slow inert gas stream, advantageously of dry nitrogen or dry air, into the reaction chamber. As already mentioned above, the reaction chambers can also be filled, without this causing any difficulty, to above the level of liquid tin(IV) chloride with pieces of metallic tin. The comparatively low concentration in the gas space does not cause any problems.

The reaction chambers, also the one(s) serving for the aftertreatment are advantageously not completely filled with tin(IV) chloride and tin but have a gas space into which tin(IV) chloride, according to its vapor pressure at the temperature prevailing at the surface of the liquid, and chlorine, according to its solubility in tin(IV) chloride and its concentration at the surface of the liquid, escape. It is advantageous to introduce into the gas spaces at least one gas which does not react with chlorine, tin or tin(IV) chloride under the prevailing conditions, so that the partial pressure of this gas constitutes 60 to 99.5%, and in particular 75 to 90%, of the total pressure prevailing in the gas space. This reduces the losses of chlorine and tin(IV) chloride. Examples of suitable non-reacting gases are carbon dioxide, oxygen, neon and in particular nitrogen or air. Any gas should be dry, that is it should contain as small an amount of admixed water vapor as possible.

In order to equalize any undesired pressure increases, gas is conducted away from the gas spaces in the reaction chambers, cooled to about 20° C. in order to lower the content of tin(IV) chloride vapors in the gas, then washed initially with water and then with an aqueous alkali to remove chlorine and residual tin(IV) chloride vapors. The gas thus purified is discharged into the atmosphere.

The new process is in general carried out under normal atmospheric pressure. However, it can also be operated under an elevated pressure, for example 0.11 to 1 MPa, but the procedure which is made more elaborate by the application of pressure and the higher equipment costs are frequently not justified by the advantages, for example improved space-time yields, which can be achieved by the application of pressure.

The tin(IV) chloride obtained after the aftertreatment and filtration contains less than 0.1% by weight of free chlorine. In order to purify it further and improve its color it can advantageously be brought into contact with adsorbing agents, in particular activated carbon. The adsorbing agents should not contain any water, which reacts with tin(IV) chloride to give a hydrate, since lumps are readily formed by this and the effect of the adsorbing agents is severely impaired thereby.

The process according to the invention makes it possible to produce, in a very efficient continuous operation which runs trouble-free for months and does not require a major control effort, high purity tin(IV) chloride in uncomplicated, readily cleaned apparatuses composed of cheap materials. The tin(IV) chloride produced can be used in virtually all known areas of industrial application.

The examples below are intended to illustrate the invention in greater detail:

The following apparatus was used:

An upright, cylindrical glass tube (I) which has a length of 550 mm and an internal diameter of 40 mm is sealed at the bottom and contains, at a distance of 20 mm from the lower end, a perforated plate which is located at right angles to the tube axis and the holes of which have a diameter of 2 mm. At the lower end of the tube there is a central opening and a lateral opening, each of which openings have separate feed lines. The glass tube supports in each case a lateral opening, which has a feed line, at a distance of 450 mm and 490 mm from the lower end and it has, at the upper end, a ground joint, onto which a cap, which has an internal diameter of 40 mm and, in turn, a central opening which has a feed line, is placed so as to give a tight seal. In addition, a temperature sensor is mounted on the cylindrical glass tube at a distance of 435 mm from the lower end.

A second, upright cylindrical glass tube (II) has the same dimensions and the same construction as the one described above.

For the two glass tubes (I and II) the openings which are located centrally at the lower end are connected via non-return valves and control valves to a source of dry chlorine gas; the openings located in the upper end caps are connected to one another via a line and to a source of dry nitrogen via a control valve. The openings which for both glass tubes (I and II) are located at a height of 490 mm are connected via a blowback safeguard to three gas wash bottles. The opening located at a height of 450 mm on the first glass tube (I) is connected via a line to the lateral opening at the lower end of the second glass tube (II). This connection line has a branch which is connected via a cock to the suction side of a pump which is described below. The opening located at a height of 450 mm on the second glass tube (II) is connected to a buffer or storage vessel, which has at the bottom a delivery line which is connected to the suction side of a Vanton Flex-i-liner ® type pump. The storage vessel is connected by means of a riser to the exit gas line. A line, which has a branch closed by a cock, runs from the delivery side of this pump to a serpentine cooler, the exit side of which is connected via a line which contains a thermosensor to the lateral opening at the lower end of the glass tube (I).

The abovementioned buffer or storage vessel has at the bottom a second delivery line which is connected via a cock to a central opening at the lower end of a third cylindrical glass tube (III), which in turn has the same construction as the first and the second glass tube except for the difference that it has a jacket and only one central opening at the lower end. The opening at a height of 450 mm on the third glass tube (III) is connected via a line to the central opening at the lower end of a fourth glass tube (IV) which has the same construction as the third glass tube. The opening at a height of 450 mm on the fourth glass tube is connected to a serpentine cooler, the exit of which is connected to a paper filter, after that to an activated carbon filter and finally to a storage vessel for the final product, which can be maintained under a pressure below atmospheric air pressure by means of a vacuum pump, when liquid builds up in the filter. The central openings in the caps which seal the glass tubes III and IV at the top are connected, together with those of the glass tubes I and II, via a control valve to a source of dry nitrogen. The openings at a height of 490 mm on the glass tubes III and IV are connected, together with those of the glass tubes I and II, to the gas wash device described above.

EXAMPLE 1

An apparatus having four upright glass tubes was used, as described above. All four glass tubes were each filled with 1,800 g of metallic tin of 99.9% purity, the glass tubes I and II being filled with cylindrical small blocks of tin having a diameter of 7 mm and a height of 10 mm and the glass tubes III and IV being filled with tin granules having a diameter of about 6 mm. Tin(IV) chloride was then added to the glass tubes up to the level of the first lateral opening (450 mm). The glass tubes were sealed with the caps and a slow flow of 2 l/h of dry nitrogen was introduced via the central openings in the caps into the space above the liquid in the glass tubes. The first two gas wash bottles, which were connected to the openings located at a height of 490 mm of the glass tubes, were filled with water and the third gass wash bottle was filled with a 5% strength sodium hydroxide solution. The tin(IV) chloride was then recycled at a rate of 6 dm$^3$h$^{-1}$ before 40 dm$^3$ (S.T.P.)h$^{-1}$ of dry chlorine were passed into the glass tube I through the central opening at the lower end, that is 63 dm$^3$ (S.T.P.)h$^{-1}$ of chlorine per dm$^3$ of tin(IV) chloride present in the reaction chamber and 0.15 dm$^3$h$^{-1}$ of circulated tin(IV) chloride per dm$^3$ (S.T.P.)h$^{-1}$ of chlorine introduced. After the temperature of the liquid in the upper part of the glass tube I had risen to 70° C., the cooler present in the pump cycle was switched on. At the start of the introduction of chlorine, the jackets of the glass tubes III and IV were heated with water at 95° C. The level of liquid in the glass tubes I and II was controlled, by slowly opening the cock located between the buffer or storage vessel and the glass tube III, so that it did not significantly rise above the lateral opening at the height of 450 mm. The cock on the branch of the connection line between glass tube I and glass tube II was only opened if necessary to maintain the level of the liquid in the glass tubes I and II at approximately the same height. The tin(IV) chloride flowing out through the lateral opening at a height of 450 mm on the glass tube IV passed through a cooler and a paper filter.

After operating for 2 hours, constant process parameters had become established. These were: the excess of tin at the beginning of the reaction was 28 times the weight of chlorine passed in per hour.

| | |
|---|---|
| Temperature at the top of tube I | 73° C., |
| Temperature at the top of tube II | 65° C., |
| Temperature at the top of tube III | 93° C. and |
| Temperature at the top of tube IV. | 91° C.; |
| Temperature at the exit of the cycle cooler: | 21° C. |
| Amount of tin(IV) chloride produced: | 231 g h$^{-1}$ (97.8% relative to Cl$_2$); |
| Average residence time in the glass tubes III and IV: | 6.1 h; |
| Product quality: | glass-clear appearance and yellowish color; |
| Content of elemental chlorine: | 0.006% by weight; |
| Yield relative to chlorine used: | 97.8%. |

The apparatus was operated continuously for 5 days, the indicated values remaining virtually constant. When the level of metallic tin in the glass tubes I and II had dropped to 4/5 of the original level, the cap of the respective tube was removed and tin was replenished to the original level, without interruption of the process.

At the end of the indicated operating time the tin(IV) chloride was passed, after the paper filter, through activated carbon. A glass-clear, colorless product having a content of elemental chlorine of 0.005 % by weight was thus obtained.

EXAMPLE 2

The procedure described in Example 1 was followed, with the difference that 75 dm$^3$ (S.T.P.)h$^{-1}$ of dry chlorine were passed into the glass tube I and the liquid in the glass tubes I and II was recycled at a rate of 15 dm$^3$h$^{-1}$. The jackets of the glass tubes III and IV were heated with water at 70° C. After a period of operation of 2 hours, constant process parameters had become established, and these were:

| | |
|---|---|
| Chlorine passed in: | 118 dm$^3$ (S.T.P.)h$^{-1}$ per dm$^3$ of tin(IV) chloride present in the reaction chamber; |
| Recycled liquid: | 0.2 dm$^3$h$^{-1}$ per dm$^3$ (S.T.P.)h$^{-1}$ of chlorine passed in. |

The excess of tin at the start of the reaction was 15 times the weight of chlorine passed in per hour.

| | |
|---|---|
| Temperature at the top of tube I | 58° C., |
| Temperature at the top of tube II | 64° C., |
| Temperature at the top of tube III | 73° C., |
| Temperature at the top of tube IV | 71° C.; |
| Temperature at the exit of the cycle cooler: | 23° C.; |
| Amount of tin(IV) chloride produced: | 426 g h$^{-1}$; |
| Average residnece time in the glass tubes III and IV: | 3¼ h; |
| Product quality: | glass-clear appearance, yellowish, colorless after filtration through activated carbon; |
| Content of elemental chlorine: | 0.006% by weight; |
| Yield, relative to chlorine used: | 96.1%. |

EXAMPLE 3

The procedure described in Example 1 was followed, with the difference that 100 dm$^3$ (S.T.P.)h$^{-1}$ of dry chlorine were passed into the glass tube I and 30 dm$^3$ (S.T.P.)h$^{-1}$ of chlorine were passed into the glass tube II. The liquid in the glass tubes I and II was recycled at a rate of 20 dm$^3$h$^{-1}$. The jackets of the glass tubes III and IV were heated with water at 95° C. After a period of operation of 2 hours, constant process parameters had become established. The tin in the glass tubes was replenished, as described in Example 1, when the tin pieces in the glass tube had sunk to 4/5 of the level reached at the beginning of the trial. As many tin pieces as were required to fill the tubes brimfull, with the end cap removed, were filled into the glass tubes I and II. In these tubes the tin charge projected beyond the level of the liquid by about 45 mm. The following process parameters were measured:

| | |
|---|---|
| Chlorine passed in: | 204 dm$^3$(S.T.P.)h$^{-1}$ per dm$^3$ of tin(IV) chloride present in the reaction chamber; |
| Recycled liquid: | 0.15 dm$^3$h$^{-1}$ per dm$^3$(S.T.P.)h$^{-1}$ of chlorine introduced; |
| Excess of tin at the beginning of the trial: | 8.6 times the weight of chlorine introduced per hour; |
| Temperature at the top of tube I | 79° C., |
| Temperature at the top of tube II | 80° C., |
| Temperature at the top of tube III | 95° C., |
| Temperature at the top of tube IV | 94° C., |
| Temperature at the exit of the cycle cooler: | 23° C.; |
| Amount of tin(IV) chloride produced: | 718 g h$^{-1}$; |
| Average residence time in the glass tubes III and IV: | 2 h; |
| Product quality: | glass-clear appearance, yellowish; |
| Content of elemental chlorine: | 0.008% by weight; |
| Yield, relative to chlorine used: | 93.6%. |

EXAMPLE 4

An apparatus similar to the one described at the outset was used, but it only consisted of two upright, cylindrical glass tubes. The first of the two glass tubes had the same construction as the glass tube I described above and the second of the two glass tubes had the same construction as the glass tube III described above.

Into each of the two glass tubes were filled 1,600 g of metallic tin of 99.9% purity in the form of granules which had an approximate particle diameter of 6 mm and, to the level of the lateral opening at a height of 450 mm, tin(IV) chloride. The trial was carried out as described in Example 1, with the following alterations: 50 dm$^3$(S.T.P.)h$^{-1}$ of chlorine were passed into the first glass tube at the bottom and 8 dm$^3$h$^{-1}$ of liquid were circulated in this glass tube. The jacket of the second glass tube was heated with water at 85° C. Between the two upright glass tubes was, analogous to the apparatus described above, a buffer or storage vessel having a cock. The latter was adjusted so that liquid in the first glass tube did not rise to significantly above the lateral opening at a height of 450 mm. After two hours, the following approximately constant process conditions had become established:

| | |
|---|---|
| Chlorine passed in: | 116 dm$^3$(S.T.P.)h$^{-1}$ per dm$^3$ of tin(IV) chloride present in the reaction chamber; |
| Recycled liquid: | 0.2 dm$^3$h$^{-1}$ per dm$^3$(S.T.P.)h$^{-1}$ of chlorine passed in; |
| Excess of tin at the beginning of the trial: | 12.4 times the chlorine passed in per hour; |
| Temperature at the top of the first tube: | 70° C.; |
| Temperature at the top of the second tube: | 85° C.; |
| Temperature at the exit of the cycle cooler: | 21° C.; |
| Amount of tin(IV) chloride produced: | 222 g h$^{-1}$; |
| Average residence time in the second tube: | 3.5 h; |
| Product quality: | glass-clear appearance, yellowish, colorless after activated carbon filtration; |
| Content of elemental chlorine: | 0.01% by weight; |
| Yield, relative to chlorine used: | 93.9%. |

Comparative Trial (analogous to U.S. Pat. No. 1,897,360)

An upright, cylindrical vessel which has an internal diameter of 100 mm and a height of 190 mm has in the middle of its bottom an opening which is connected via a non-return valve to a control valve and outside the middle two more openings. Another opening is located on the side of the shell of the vessel at a height of 150 mm which is connected via a serpentine cooler to the suction side of a Vanton Flex-i-liner ® pump, the delivery side of which is in connection with one of the openings located off the center of the vessel at the bottom. The second of these openings has a feed line with a cock. The vessel has a detachable bulb-type condenser the exit of which is connected to a line which leads to the central opening at the bottom of the vessel. A branch with a cock leads from this line to a blowback safeguard and then to three gas wash bottles. A perforated plate is mounted in the vessel at a height of 20 mm above the bottom. At the beginning of the trial, the vessel was filled with 3,000 g of tin of 99.9% purity in the form of small cylindrical blocks which had a diameter of 7 mm and a height of 10 mm and, in addition, liquid tin(IV) chloride to the level of the opening located in the vessel at a height of 150 mm. The tin blocks were completely covered with tin(IV) chloride. 350 dm$^3$(S.T.P.)h$^{-1}$ of dry chlorine were then passed in via the central opening at the bottom of the vessel, 6 dm$^3$h$^{-1}$ of the liquid was circulated in the reaction chamber and the bulb-type condenser was switched on. When the liquid in the vessel began to boil, the serpentine cooler was also switched on. The cock at the second lateral opening at the bottom of the vessel was opened to such an extent that the liquid in the vessel did not rise above the opening located laterally at a height of 150 mm. The product draining off was collected in a further vessel, and samples were taken from it and analyzed for the content of free chlorine. Half an hour after the start of the trial, the tin(IV) chloride produced contained 1.1% by weight of free chlorine. The value increased in the following period. 1½ hours after the start of the trial the major part of the metallic tin had been consumed. The supply of chlorine was interrupted, the cock at the branch after the ball condenser was opened and the device was flushed with dry nitrogen in order to remove the atmosphere, composed of chlorine and tin(IV) chloride vapors, in the vessel and the bulb-type condenser via the gas wash bottles. The gas wash bottle which was the first gas wash bottle in the direction of the flow of the gas was filled with water and the subsequent gas wash bottles were filled with a 5% strength sodium hydroxide solution. The bulb-type condenser was then removed from the vessel in order to replenish the metallic tin, as described above, to the level of the small tin blocks at the start of the trial. The bulb-type condenser was replaced, the nitrogen supply was interrupted and chlorine was again passed in at the rate described above. In order to displace the major part of the nitrogen from the vessel, the cock at the branch behind the ball condenser was left open for about another 5 minutes and was then closed. The storage vessel for the tin(IV) chloride produced was changed. Half an hour after the renewed passing-in of chlorine had started, the tin(IV) chloride produced contained 0.9% by weight of free chlorine. After another hour, metallic tin was again replenished after the flushing had been carried out as described above with dry nitrogen. In order to extend the time period until the apparatus had to be opened again, this time an amount of metallic tin was charged such that it exceeded the level of the liquid tin(IV) chloride in the vessel by 25 mm. After chlorine had been passed in again, as described above, all the time increasingly more uncontrolled reactions of the tin with the chlorine in the gas space of the liquid tin(IV) chloride were observed which produced light phenomena and a partial sintering of the small tin blocks and also an abrupt boiling-up of the tin(IV) chloride dripping from the bulb-type condenser. The sintering of the small tin blocks impaired their uniform settling into the liquid tin(IV) chloride and the trial was terminated. One hour after the start of the total trial the following process parameters were determined:

| | |
|---|---|
| Chlorine passed in: | 457 dm$^3$(S.T.P.)h$^{-1}$ per dm$^3$ of liquid present in the reaction chamber; |
| Recycled liquid: | 0.013 dm$^3$h$^{-1}$ per 1 dm$^3$(S.T.P.)h$^{-1}$ of chlorine passed in per hour. |

The excess of tin at the start of the reaction was 2.6 times the weight of chlorine passed in per hour.

The reaction was carried out under atmospheric pressure at the temperature of boiling tin(IV) chloride, that is to say at about 114° C. The product produced was turbid and colored markedly yellow. It contained 1.0% by weight of free chlorine.

We claim:

1. In a process for the production of tin(IV) chloride by reacting excess metallic tin with chlorine in the presence of liquid tin(IV) chloride at temperatures of 20° to 90° C., under atmospheric pressure or elevated pressure, in which process chlorine is passed from below into a tin/chlorine reaction zone, the tin(IV) chloride formed is removed at the top from the tin/chlorine reaction zone and is reintroduced into said reaction zone from below after cooling and in which as much tin(IV) chloride is discharged as is required from the level of tin(IV) chloride in the tin/chlorine reaction zone to remain constant, the improvement which comprises passing in, per dm$^3$ of tin(IV) chloride present in the tin/chlorine reaction zone, 30 to 300 dm$^3$ (S.T.P.)h$^{-1}$ of chlorine, maintaining an excess of tin of at least four times the weight of the chlorine passed in per hour, and recycling, per 1 dm$^3$ (S.T.P.)h$^{-1}$ of chlorine passed in, 0.08 to 0.3 dm$^3$h$^{-1}$ of tin(IV) chloride, tin(IV) chloride which is taken out of circulation being treated in an aftertreatment zone without the addition of chlorine at a temperature of 60° to 100° C. and for an average residence time of 1 to 7 h, said aftertreatment zone comprising at least one reaction chamber filled with metallic tin and tin(IV) chloride, the thus-aftertreated tin(IV) chloride product being then filtered.

2. The process as claimed in claim 2 wherein said tin/chlorine reaction zone is comprised of a plurality of reaction chambers which are separate from one another, each of which is filled with metallic tin and through which successively tin(IV) chloride flows, while at least a major amount of chlorine is passed into the first reaction chamber in direction of flow of tin(IV) chloride and a remaining amount of chlorine is introduced to the reaction chamber which is the next in the direction of flow of the tin(IV) chloride.

3. The process as claimed in claim 1, wherein the aftertreatment zone is composed of a plurality of aftertreatment reaction chambers which are separate from one another and filled with metallic tin and through which successively tin(IV) chloride flows.

4. The process as claimed in claim 1, wherein the reaction of chlorine with tin is carried out in the presence of recycled tin(IV) chloride at 30° to 80° C.

5. The process as claimed in claim 1, wherein 60 to 150 dm$^3$ (S.T.P.)h$^{-1}$ of chlorine are introduced per dm$^3$ of tin(IV) chloride present in the tin/chlorine reaction zone in the reaction of chlorine with tin in the presence of recycled tin(IV) chloride.

6. The process as claimed in claim 1, wherein 0.12 to 0.2 dm$^3$h$^{-1}$ of tin(IV) chloride is recycled per 1 dm$^3$ (S.T.P.)h$^{-1}$ of chlorine passed into the tin/chlorine reaction zone in the reaction of chlorine with tin in the presence of recycled tin(IV) chloride.

7. The process as claimed in claim 1, wherein the treatment of tin(IV) chloride in said aftertreatment zone is carried out at 80° to 100° C.

8. The process as claimed in claim 1, wherein a residence time of 1.5 to 3.5 h is established in the treatment of the tin(IV) chloride in the aftertreatment zone.

9. The process as claimed in claim 1, wherein each reaction chamber in said tin/chloride reaction zone and said aftertreatment zone is replenished continuously or at intervals with metallic tin in the form of solid pieces or bars, at the latest when only ⅔ of the total reaction chamber which is filled with tin(IV) chloride contains metallic tin.

10. The process as claimed in claim 1, wherein each reaction chamber in said tin/chlorine reaction zone and said aftertreatment zone contains a gas space into which at least one gas is introduced which does not react with chlorine, tin or tin(IV) chloride under the prevailing conditions, such that the partial pressure of this gas constitutes 60 to 99.5% of the total pressure prevailing in the gas space.

11. The process as claimed in claim 10, wherein dry nitrogen or dry air is passed into the gas space within each reaction chamber.

12. The process as claimed in claim 1, wherein the tin(IV) chloride is brought into contact with activated carbon after the treatment in said aftertreatment zone in order to improve the color and minimize the chlorine content of the tin(IV) chloride.

13. A process for producing tin(IV) chloride from an excess of metallic tin and chlorine in a tin/chlorine reaction zone containing a recycled portion of the tin-(IV) chloride reaction product, comprising:

passing in, per $dm^3$ of tin(IV) chloride present in the tin/chloride reaction zone, 30 to 300 $dm^3$ (S.T.P.)$h^{-1}$ of chlorine, maintaining an excess of tin of at least four times the weight of the chlorine passed in per hour, recycling, per 1 $dm^3$ (S.T.P.) $h^{-1}$ of chlorine passed in, 0.08 to 0.3 $dm^3 h^{-1}$ of tin(IV) chloride, removing a portion of the circulating tin(IV) chloride reaction product from circulation for purification and recovery as the product of said process, and treating the thus-removed portion of tin(IV) chloride in an aftertreatment zone without the addition of chlorine at a temperature of 60° to 100° C. and for an average residence time of 1 to 7 h, said aftertreatment zone comprising at least one reaction chamber containing metallic tin and tin(IV) chloride, thereby improving the purity of the tin(IV) chloride reaction product.

* * * * *